United States Patent
Jonsson et al.

(10) Patent No.: US 10,296,377 B1
(45) Date of Patent: May 21, 2019

(54) BATCH JOB EXECUTION USING COMPUTE INSTANCES

(71) Applicant: Amazon Technologies, Inc., Seattle, WA (US)

(72) Inventors: Jan Henrik Jonsson, Long Beach, CA (US); Ryan Newcomb Durkin, Long Beach, CA (US); Grahem Cuthbertson, Aliso Viejo, CA (US); George Lin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 15/275,246

(22) Filed: Sep. 23, 2016

(51) Int. Cl.
*G06F 9/46* (2006.01)
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

| | | | | |
|---|---|---|---|---|
| 7,689,676 B2 * | 3/2010 | Vinberg | ................... | G06F 8/61 |
| | | | | 703/20 |
| 8,990,820 B2 * | 3/2015 | Plancarte | .............. | G06F 9/4843 |
| | | | | 718/101 |
| 2010/0312776 A1 * | 12/2010 | Burrichter | ......... | G06F 17/30395 |
| | | | | 707/759 |
| 2015/0205634 A1 * | 7/2015 | McPherson | ........... | G06F 9/5027 |
| | | | | 718/102 |
| 2015/0220373 A1 * | 8/2015 | Chen | ................... | G06F 11/0757 |
| | | | | 718/106 |

* cited by examiner

*Primary Examiner* — Gregory A Kessler
(74) *Attorney, Agent, or Firm* — Davis Wright Tremaine LLP

(57) ABSTRACT

A computing resource service receives a request to execute a batch job. The computing resource service invokes a first compute instance to divide the batch job into a plurality of job fragments, where each job fragment comprises a respective subset of operations for the batch job that can be processed within a limited lifespan of a compute instance. The job fragments are distributed among a plurality of second compute instances to enable collective processing of the job fragments. The status of the batch job is determined based at least in part on individual statuses of the job fragments.

20 Claims, 9 Drawing Sheets

BATCH JOB EXECUTION USING COMPUTE INSTANCES

BACKGROUND

Companies and individuals seeking to reduce the expense and overhead associated with maintaining their own computing resources have turned instead to utilizing compute instances, offered by computing resource service providers to their customers. Compute instances are often configurable to meet various computing needs of the customers of the computing resource service provider and can be rapidly deployed to perform various tasks in support of these computing needs. However, compute instances are often used for short-lived transient jobs and can only be instantiated for a limited time before terminating. Thus, it can be difficult for a customer to execute large batch jobs quickly and reliably using compute instances. Relying on remote program execution over multiple virtual machine instances and remote data storage may be difficult, as customer are required to manage various applications running on multiple virtual machine instances. Further, such applications may not be portable to other computing systems or scalable to meet an increased need for resources.

BRIEF DESCRIPTION OF THE DRAWINGS

Various techniques will be described with reference to the drawings, in which.

DETAILED DESCRIPTION

Figure 1:
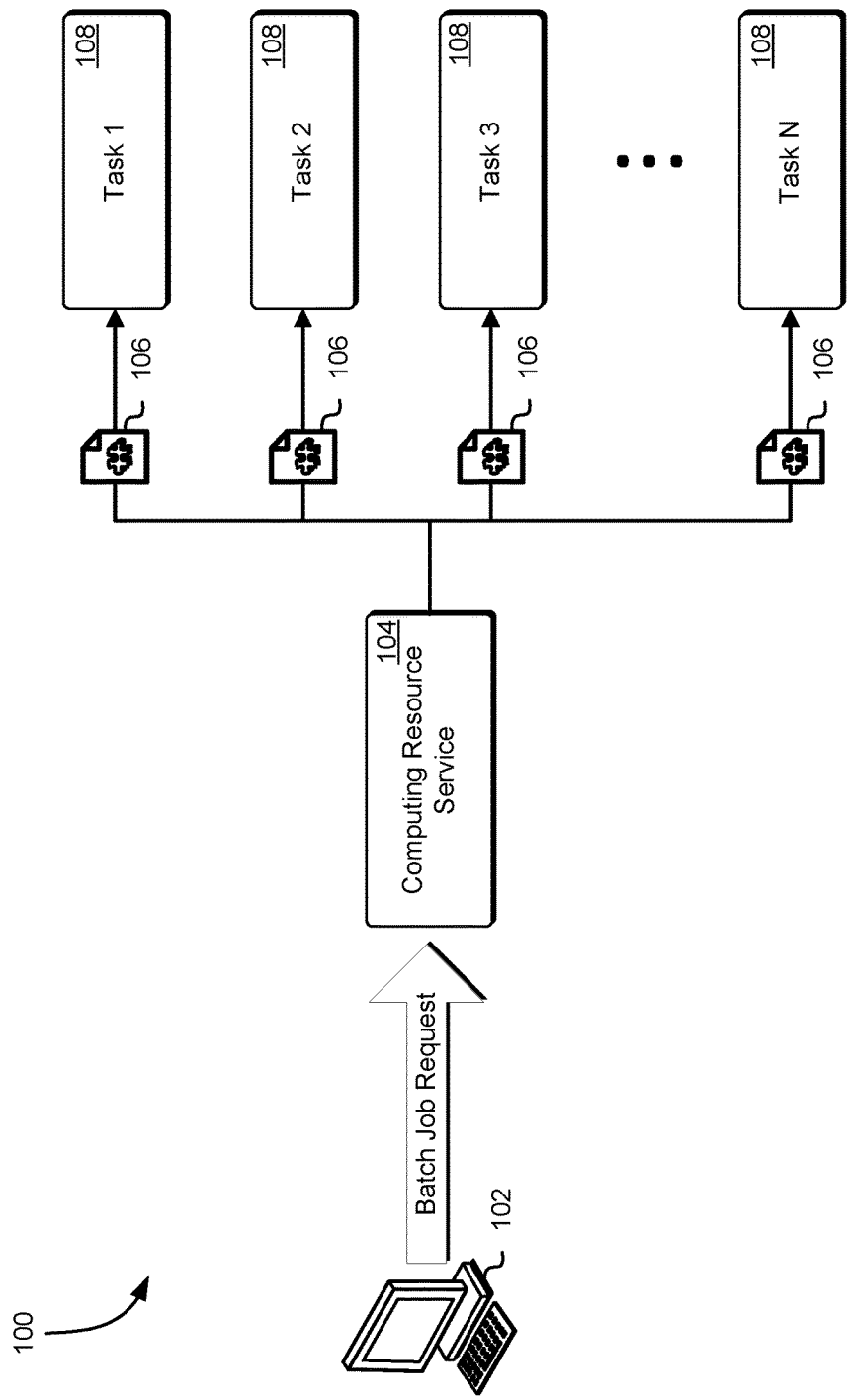
FIG. 1 shows an illustrative example of an environment in which various embodiments can be implemented.

This disclosure relates to the execution and operation of compute instances and tasks to perform batch jobs on behalf of customers of a computing resource service provider. In an example, a computing resource service receives a request from a customer of the computing resource service provider to process a batch job. The batch job may comprise various operations and processes that need to be performed to support the customer's business needs. Further, the customer may require that the batch job be completed within a short period of time. In response to the request, the computing resource service may create a database record for the batch jobs and assign a unique identifier to the job. Further, the computing resource service may specify, in the database record, a task definition for the job, an attribute that indicates which task is responsible for executing the job, and the state of the job. In various examples, the computing resource service submits a request to an time-bound compute service to invoke a task. This request may include the unique identifier for the job, which the task may use to identify the database record for the job and obtain the task definition for the job.

In an example, the task evaluates the task definition for the requested job and determines how to divide the job into various job fragments to enable various job fragment tasks to process each job fragment. The task may configure each job fragment such that the job fragment may be processed by a job fragment task within its lifespan. In some instances, the task may generate, within the job database record, an additional table that may be used to track the health and operation of each job fragment task. For example, the task may create an entry for each of the job fragment tasks such that the entry describes the job fragment being processed by the job fragment task and the operations performed as part of the job. The entry may specify the unique identifier of the job, a unique identifier for the particular job fragment being processed by the job fragment task, the task definition for the job fragment in relation to the job itself, and the state of the job fragment. The task may also update the database record to indicate the number of job fragments that the job was divided into and introduce a field within the database record that can be used to indicate completed and failed job fragments.

The task may invoke a job fragment task for each job fragment created by the task from the job obtained from the customer. The task may pass to a job fragment task the unique identifier for both the job and for the specific job fragment that is to be processed by the job fragment task. As each job fragment task is invoked, the task may update the job database record to indicate that the job fragments have been executed, as well as a timestamp for each job fragment task, which may indicate a time at which the job fragment task was invoked. In response to the successful invocation of the job fragment tasks and the update of the job database record, the task may terminate. If a job fragment is completed successfully, the job fragment task that processed the job fragment may access the job database record to indicate that processing of the job fragment has been completed. In some examples, the computing resource service invokes a task dedicated to determining whether job fragment tasks have been completed successfully by the various job fragment tasks. If the task determines that a particular job fragment has not been completed within the lifespan of the corresponding job fragment task, the task may retry processing of the job fragment by invoking a new job fragment task and provide the job fragment to this job fragment task. If the job fragment still cannot be completed successfully, the task may update the database record to indicate that processing of the job fragment has failed.

In an example, each job fragment task evaluates the database record to determine whether the job fragment processed by the job fragment task is the final job fragment for the batch job. For instance, a job fragment task may evaluate the job database record to identify the total number of completed and failed job fragments processed by other job fragment tasks and compare this number to the number of total job fragments created for processing of the batch job. If the numbers match, including the job fragment processed by the job fragment task, the job fragment task may determine whether the batch job has been completed successfully or has failed due to the failure of certain job fragments from being processed. Based on this determination, the job fragment task may update the job database record to indicate that the batch job has either been completed successfully or has failed. The computing resource service may access the job database record to determine the status of the batch job and provide an update to the customer in response to a final determination regarding the batch job by the job fragment task.

In this manner, a computing resource service can rely on compute instances and tasks to perform batch jobs that otherwise could not be processed using such compute instances and tasks. In addition, the techniques described and suggested in this disclosure enable additional technical advantages. For instance, because each job fragment task has a pre-defined lifespan, the computing resource service can invoke a task to monitor each job fragment task to determine whether its corresponding job fragment by determining if the timestamp for the job fragment task denotes that the job fragment task has been operating for a period of time longer than its pre-defined lifespan. Thus, the computing resource service may quickly determine the status of a batch job and may enable users to utilize the unique identifier for the batch job to determine the status of the batch job.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a customer 102 of a computing resource service provider may transmit a request to a computing resource service 104 provided by the computing resource service provider to execute a batch job on behalf of the customer 102. In order for the customer to interact with the computing resource service provider and access the computing resource service 104, the customer 102 may be required to provide credential information for authentication to a graphical user interface (GUI), whereby the GUI may utilize the provided credential information to generate a digital signature or hash that may be utilized for authentication. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like. The computing resource service provider may utilize the obtained digital signature or hash from the GUI to authenticate the customer 102 and determine whether the customer 102 may access the computing resource service 104.

In an embodiment, the computing resource service 104, in response to the request from the customer 102, generates a job database record for the batch job from the customer 102 to track processing of the batch job. For instance, the computing resource service 104 may transmit a request to a database service provided by the computing resource service provider to generate the job database record. Alternatively, the computing resource service 104 may generate and maintain the job database record locally (e.g., within the ambit of the computing resource service 104). In the job database record, the computing resource service 104 may generate an entry for the batch job that includes a unique identifier for the batch job, a definition of the operations that are to be performed as part of the batch job, an attribute that indicates which task is responsible for executing the batch job, and the state of the batch job. In some embodiments, the computing resource service 104 submits a request to a time-bound compute service to invoke a task that can be used to initiate processing of the batch job. The time-bound compute service may provide a unique identifier for the task to the computing resource service 104, which the computing resource service 104 may enter as the attribute in the job database record.

In its request to the time-bound compute service, the computing resource service 104 may provide the unique identifier for the batch job. The time-bound compute service, in response to the request, may invoke a compute instance that may operate as a task according to a task definition defined in the job database record. Compute instances may include software containers, virtual machine instances, and any other compute process that is time-bound (e.g., has a limited lifespan) for performance of one or more operations. The task may obtain the task definition specified in the job database record and determine how to divide the batch job into one or more job fragments 106 that can be processed by individual job fragment tasks 108. For instance, the task may evaluate the task definition from the job database record to identify one or more operation endpoints for the batch job. Based at least in part on these identified one or more operation endpoints, the task may divide the batch job into individual job fragments 106 such that each job fragment 106 may be processed by a job fragment task 108 within its lifespan.

The task may access the job database record to create an entry for each of the job fragments 106 generated by the task from the batch job. Each entry may describe what operations of the batch job are to be performed as part of the job fragment 106. Additionally, each entry may specify the identifier of the batch job to which the job fragment 106 belongs, a unique identifier for the job fragment 106 itself, the definition of the operations to be performed as part of the entire batch job, and the state of the job fragment 106. The task may also add an attribute in the job database record that denotes the total number of job fragments that the batch job was divided into. In some instances, the task may update the state of the batch job within the entry for the batch job to denote that the batch job is being processed. An entry may be added to the job database record to specify the number of completed and the number of failed job fragments 106, which initially may both be set to zero or any other notation that may be used to denote that no job fragments 106 have been successfully processed or have failed.

Based at least in part on the number of job fragments 106 identified by the task, the computing resource service 104 may transmit a request to the time-bound compute service to invoke a job fragment task 108 for each job fragment 106 generated by the task. In response to the request, the time-bound compute service may provision one or more compute instances that may be used as the job fragment tasks 108 for processing the job fragments 106. The computing resource service 104 may pass a unique identifier for both the batch job and for the specific job fragment 106 to be processed by the job fragment task 108 to the job fragment task 108. Additionally, the computing resource service 104 may update the job database record to specify a timestamp for the time at which the job fragment task 108 was invoked. The job fragment task 108 may access the job database record to obtain the task definition for the job fragment 106 and initiate processing of the operations corresponding to the job fragment 106 assigned to the job fragment task 108. As the job fragment task 108 initiates execution of the one or more operations corresponding to the job fragment 106, the computing resource service 104 or the job fragment task 108 may update the job database record entry corresponding to the job fragment 106 to specify that the job fragment 106 is being processed. It should be noted that the processing of each individual job fragment 106 is idempotent for fault tolerance (e.g., each job fragment 106 corresponds to a specific set of operations and does not overlap with other job fragments).

If a job fragment task 108 successfully completes processing of its assigned job fragment 106, the job fragment task 108 may update its entry in the job database record to denote that processing of the job fragment 106 has been completed. Additionally, the job fragment task 108 may update the entry corresponding to the number of completed job fragments to indicate that it has completed processing of the job fragment 106. For instance, the job fragment task 108 may increment this entry by one or some other value that can be used to denote that a job fragment has been processed successfully. The job fragment task 108 also determine whether the number of completed job fragments and failed job fragments is equal to the total number of job fragments 106 generated for the batch job. If the combined number of completed and failed job fragments is less than the total number of job fragments 106 for the batch job, the job fragment task 108 may terminate.

In an embodiment, the computing resource service 104 submits a request to the time-bound compute service to launch a monitoring task that may be used to monitor processing of the various job fragments 106 by the one or more job fragment tasks 108. This monitoring task may be executed based at least in part on the lifespan of a task. For instance, if a task is configured with a lifespan of ten minutes, the monitoring task may be invoked every ten minutes while job fragments 106 are being processed by the job fragment tasks 108. The monitoring task may query the job database record to identify any job fragments 106 are being processed by a job fragment task 108 or have otherwise been assigned to an invoked job fragment task 108. If an entry for a particular job fragment 106 is returned that has an execution timestamp that is older than the lifespan of its corresponding job fragment task 108, the monitoring task may determine that the job fragment 106 has not been processed successfully. The lifespan of the job fragment tasks 108 may be defined by the time-bound compute service, which may enforce a lifespan for tasks independently from the tasks themselves (e.g., all tasks are limited to a particular number of minutes, etc.). In some embodiments, if the job fragment 106 is not processed successfully, the monitoring task may update the entry for the job fragment in the job database record to add an attribute for a retry count if it does not exist and increment the attribute by one. If the retry count is less than a predetermined maximum retry count, the monitoring task may invoke a new job fragment task 108 for processing of the job fragment 106. If the retry count for a particular job fragment 106 is at the predetermined maximum retry count, the monitoring task may access the job database record to update the entry corresponding to the number failed job fragments. For instance, the monitoring task may increment this entry by one to denote that a failed job fragment has been identified. Further, the monitoring task may update the entry for the job fragment itself to denote that processing of the job fragment has failed.

If a job fragment 106 is processed successfully, the corresponding job fragment task 108 may determine whether the total number of completed and failed job fragments is equal to the total number of job fragments for the batch job. If the total number of completed and failed job fragments is equal to the total number of job fragments for the batch job, the job fragment task may evaluate the completed and failed job fragments to determine whether the batch job has been completed successfully within a particular fault tolerance for the batch job. For instance, the batch job may be declared as complete if a minimum number of job fragments 106 are processed successfully by the one or more job fragment tasks 108. Additionally, or alternatively, the batch job may be declared as complete if a minimum number of critical operations, as identified by the original task that divided the batch job into the job fragments 106, are completed successfully. If the batch job is completed successfully, the job fragment task 108 may update the job database record to specify that the batch job has been processed successfully.

In an embodiment, if the monitoring task determines that a failed job fragment is the final job fragment of the batch job and the retry count for the failed job fragment is at the maximum retry count, the monitoring task will invoke a job fragment task to finalize execution of the batch job. For instance, the monitoring task may pass the batch job identifier to the invoked job fragment task but may not provide the failed job fragment for processing. This job fragment task may perform the operations described above to determine whether the batch job has been completed successfully. For instance, the job fragment task may update the job database record to specify whether the batch job has been completed successfully or has failed due to the failure in processing of one or more job fragments 108.

While a retry count is used to determine whether to retry processing of a failed job fragment 106, other techniques may be used to attempt successful completion of the operations corresponding to the particular job fragment 106. For instance, the monitoring task may divide the job fragment 106 into one or more smaller job fragments, each including a subset of the operations corresponding to the job fragment 106. The monitoring task may update the job database record entry for the job fragment 106 to denote the creation of the smaller job fragments and to track the processing of these smaller job fragments. Further, the monitoring task may update the entry corresponding to the total number of job fragments to include the number of smaller job fragment created. The monitoring task may invoke one or more new job fragment tasks 108 to process these smaller job fragments and determine whether these smaller job fragments are processed successfully. These new job fragment tasks may also update the job database record if the corresponding smaller job fragments are completed successfully.

Figure 2:
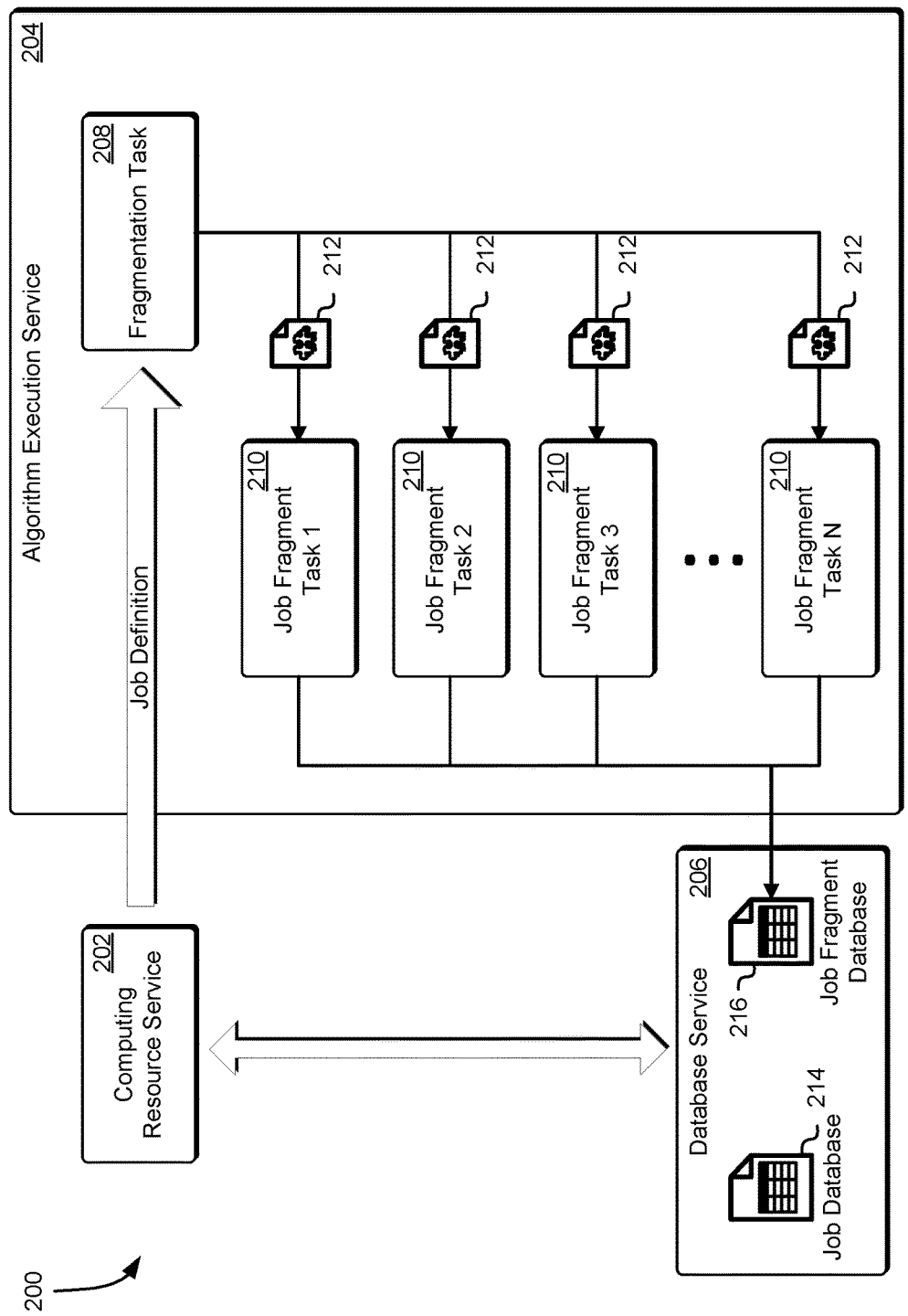
FIG. 2 shows an illustrative example of an environment in which a fragmentation task divides a batch job into one or more job fragments that can be processed by one or more job fragment tasks in accordance with at least one embodiment.

As noted above, a computing resource service may transmit a request to a time-bound compute service to invoke one or more compute instances, such as software containers, that may function as tasks for processing one or more job fragments of a batch job. For instance, the computing resource service may transmit a request to the time-bound compute service to invoke a task that may divide a batch job into one or more job fragments. The computing resource service may invoke a task for each of the one or more job fragments to process the one or more fragments, thus executing the batch job. Accordingly, FIG. 2 shows an illustrative example of an environment 200 in which a fragmentation task 208 divides a batch job into one or more job fragments 212 that can be processed by one or more job fragment tasks 210 in accordance with at least one embodiment.

In the environment 200, a computing resource service 202 receives a request from a customer of a computing resource service provider to execute a batch job. In response to the request, the computing resource service 202 may access a database service 206 to create a job database record 214 for the batch job. The job database record 214 may comprise a key-value store, whereby entries may correspond to individual batch jobs and other jobs received and processed by the computing resource service 202. For instance, in response to the request to execute a batch job, the computing resource service 202 may create an entry for the batch job in the job database record 214. This particular entry may include a unique identifier for the batch job, a definition of the operations that need to be performed, an attribute that can be used to indicate which fragmentation task 208 is responsible for executing the batch job, and the state of the batch job, which may initially be set to "created" or some other designation that can be used to denote that the batch job has been initialized.

The computing resource service 202 may transmit a request to the time-bound compute service 204 to invoke a fragmentation task 208 that can be used to divide the batch job, based at least in part on a job definition of the batch job specified in the job database record 214, into one or more job fragments 212. The time-bound compute service 204 may be a service provided by the computing resource service provider to allow customers and computing resource services to execute containers and other computer instances within a container instance. Additionally, the time-bound compute service 204 may enforce time limits on the use of containers and computer instances. For instance, the time-bound computer service 204 may impose a time limit on tasks that can be performed by the containers and other computer instances provided by the time-bound compute service 204. The time limit may be based at least in part on a particular time range (e.g., five minutes, ten minutes, etc.), a maximum number of processes and operations that can be performed within a particular time range, and the like. The time-bound compute service 204 may be similar to the time-bound compute service described in greater detail below. These containers may operate as tasks, such as the fragmentation task 208 or any of the job fragment tasks 210 that can be used to process the one or more job fragments 212.

In response to receiving an indication from the time-bound compute service 204 that the fragmentation task 208 has been invoked (e.g., an identifier for the fragmentation task 208 is provided), the computing resource service 202 may transmit the unique identifier for the batch job to the fragmentation task 208. This may cause the fragmentation task 208 to obtain, from the job database record 214, the definition of the operations that need to be performed for the batch job. The definition of the operations that need to be performed may be expressed in terms of endpoints, whereby each endpoint may correspond to the approximate amount of time required to complete processing of the endpoint. As each task provided by the time-bound compute service 204 may have a pre-defined lifespan, the fragmentation task 208 may use the definition of operations to divide the batch job into one or more job fragments 212 that can be processed by the job fragment tasks 210 within the lifespan of these job fragment tasks 210.

The fragmentation task 208 may access the database service 206 to create a job fragment database record 216 that can be used to track processing of the one or more job fragments 212. The job fragment database record 216 may comprise a key-value store, whereby each entry in the job fragment database record 216 may correspond to a unique identifier for a job fragment 212 of the one or more job fragments 212. The fragmentation task 208 may specify, for the entry corresponding to a job fragment 212, the identifier of the batch job, a unique identifier for the job fragment 212, the definition of the operations to be performed for the job fragment 212, and the state of the job fragment 212. The state of the job fragment 212 may initially be set to "created" or some other designation that can be used to denote that the job fragment 212 has been initialized. The fragmentation task 208 may also access the job database record 214 to update the entry for the batch job to specify the number of job fragments 212 created by the fragmentation task 208, the number of job fragments 212 successfully processed, and the number of failed job fragments. The number of successfully processed and failed job fragments may have an initial value of zero to indicate that no job fragments 212 have been successfully processed or have failed.

The fragmentation task 208 may invoke one or more job fragment tasks 210 that may each process a job fragment 212 created by the fragmentation task 208. The fragmentation task 208 may provide a job fragment task 210 with the unique identifier of the batch job and of the specific job fragment that is to be processed by the job fragment task 210. As the job fragment task 210 is invoked, the fragmentation task 208 may update the entry for the assigned job fragment 212 in the job fragment database record 216 to specify that the job fragment 212 has been executed. Further, the fragmentation task 208 may update the entry to add a new attribute that may be used to specify a timestamp of when execution of the job fragment 212 was initiated. The fragmentation task 208 may terminate if the job fragment database record 216 is updated successfully for each job fragment 212.

Each job fragment task 210 may use the identifiers provided by the fragmentation task 208 to identify the job fragment 212 and the operations corresponding to the job fragment 212. The job fragment task 210 may access the job fragment database record 216 to update the state of the job fragment 212 to indicate that the job fragment 212 is being processed. Further, the job fragment task 210 may initiate processing of the one or more operations corresponding to the job fragment 212. If the job fragment task 210 successfully completes processing of the operations corresponding to the job fragment 212, the job fragment task 210 may update the entry for the job fragment 212 in the job fragment database record 216 to specify that the job fragment 212 has been processed successfully. Further, the job fragment task 210 may access the job database record 214 to update the entry for the batch job to specify that the job fragment 212 has been processed successfully. This may entail incrementing the number of job fragments 212 successfully processed as specified in the entry by one.

In an embodiment, the computing resource service 202 invokes, via the time-bound compute service, a monitoring task that can query the entries corresponding to job fragments 212 identified as having been executed or are being processed based at least in part on the timestamp for these job fragments. If a job fragment 212 is identified that has a timestamp that is older than the lifespan of a job fragment task 210, the monitoring task may determine that the job fragment 210 has not been processed successfully and, thus, has failed. If a job fragment 212 has failed, the monitoring task may add an attribute for a retry count to the entry corresponding to the job fragment 212 and increment the retry count by one. The monitoring task may execute a new job fragment task 210 to attempt processing of the operations corresponding to the job fragment 212. If the entry for the job fragment 212 specifies an attribute for a retry count and the retry count is equal to a predetermined maximum value, the monitoring task may update the entry corresponding to the job fragment 212 to indicate that the job fragment 212 has failed. Further, the monitoring task may update the entry for the batch job in the job database record 214 to indicate that the job fragment 212 has failed. For instance, the monitoring task may increment the number of failed job fragments by one in the entry.

If a job fragment task 210 successfully processes the operations corresponding to its assigned job fragment 212, the job fragment task 210 may evaluate the entry for the batch job in the job database record 214 to determine if the total number of completed and failed job fragments is equal to the total number of job fragments created from the batch job. If the total number of completed and failed job fragments is equal to the total number of job fragments created from the batch job, the job fragment task 210 may determine whether the batch job has been completed successfully or if the batch job has failed. For instance, the job fragment task 210 may evaluate the entry for the batch job in the job database record 214 to identify one or more criteria for determining whether the job is completed successfully. The one or more criteria may include: successful performance of particular operations, a maximum number of acceptable failed job fragments, a minimum number of successfully processed job fragments, and the like. If the batch job is completed successfully, the job fragment task may update the entry for the batch job in the job database record 214 to indicate that the batch job has been completed successfully.

In some embodiments, if the monitoring task determines that the final job fragment 212 has failed, the monitoring task invokes a new job fragment task 210 and passes the batch job identifier to this job fragment task 210 to complete processing of the batch job. This new job fragment task 210 may determine whether the batch job has been completed successfully or if the batch job has failed, as described above. Additionally, the new job fragment task 210 may update the entry for the batch job in the job database record 214 to indicate whether the batch job has been completed successfully or has failed.

Figure 3:
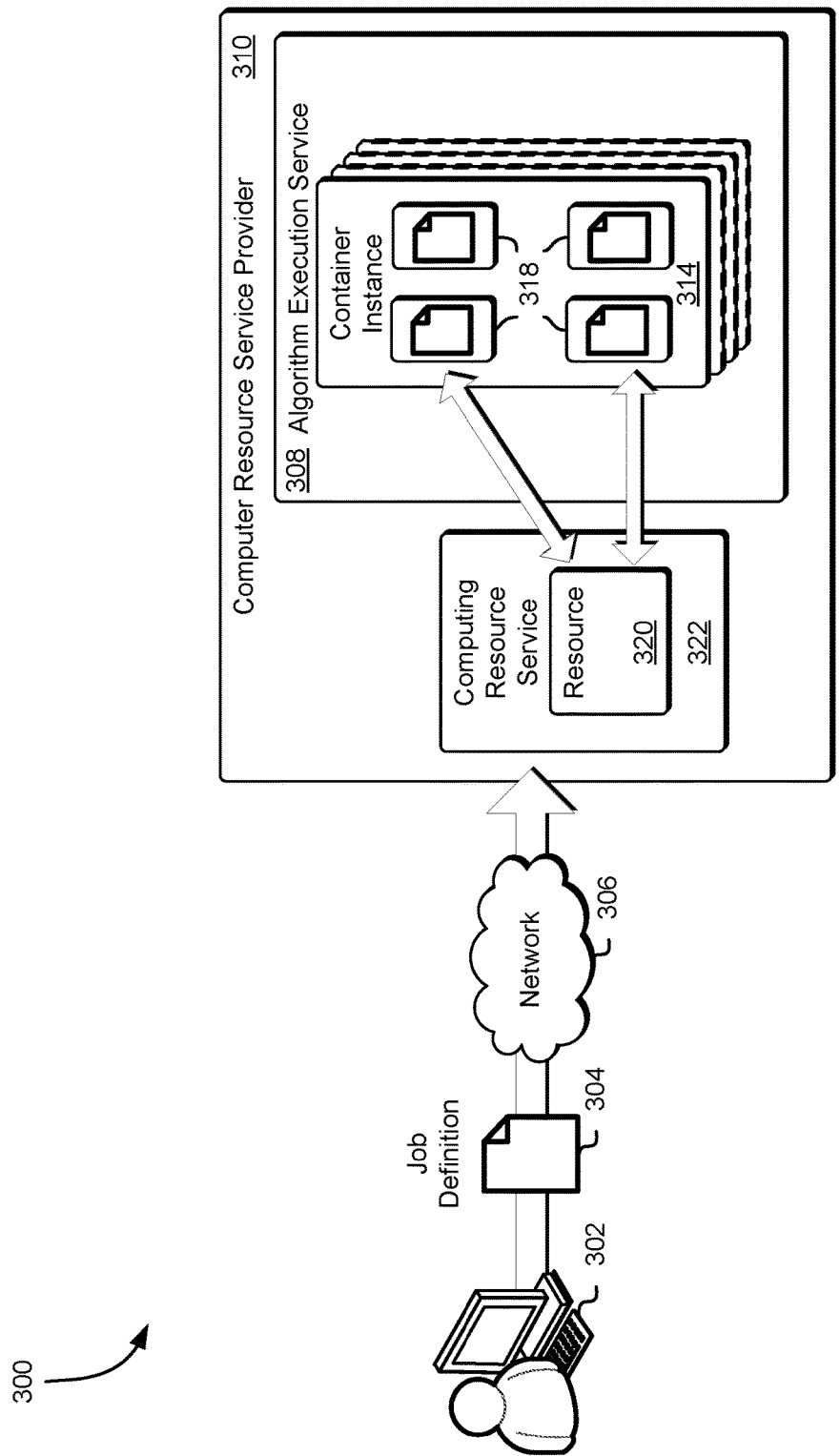
FIG. 3 shows an illustrative example of an environment in which a computing resource service utilizes an time-bound compute service to invoke one or more tasks for processing a batch job provided by a customer in accordance with at least one embodiment.

FIG. 3 shows an illustrative example of an environment 300 in which a computing resource service utilizes an time-bound compute service to invoke one or more tasks for processing a batch job provided by a customer in accordance with at least one embodiment. The environment 300 may include a customer 302 that sends a job definition file 304 for a batch job along with a request to launch the batch job through a network 306 to a computing resource service 322 of a computing resource service provider 310. The computing resource service 322 may create an entry for the batch job in a job database record provided by a database service of the computing resource service provider 310. This entry may specify a unique identifier for the batch job, the job definition file 304 or information specified in the job definition file 304, an attribute that indicated which task is responsible for executing the batch job, and the state of the batch job.

In an embodiment, the computing resource service 322 submits a request to an time-bound compute service 308 to invoke a fragmentation task that can divide the batch job into one or more job fragments. A scheduler or other component of the time-bound compute service 308, such as a front-end service, may determine into which container instance 314 that the container 318 that can operate as the fragmentation task should be launched. In some embodiments, the software containers may share resources 320 provided by the computing resource service 322 of the computing resource service provider 310, such as a storage volume provided by a block-level data storage service of the computing resource service provider 310. The fragmentation task may divide the job definition for the batch job into one or more job fragments, which may be executed by one or more other containers 318. These one or more other containers 308 may process the one or more job fragments and update the job database record to indicate completion or failure of a job fragment and determine whether the batch job has been completed successfully. Additionally, the one or more other containers may also utilize fault tolerance to retry execution of a particular job fragment if a job fragment has not been processed successfully, as discussed above.

The customer 302 may be an individual associated with a customer account of the computing resource service 322, or may be an individual, system, resource computing device, or other entity authorized to act on behalf of the individual associated with the customer account. Furthermore, the resources of the customer 302 may be made available to other users. For example, the customer 302 may utilize the resources of the computing resource service 322 to provide an online marketplace for other users, and these other users may then buy and/or sell goods and services through the online marketplace provided by the customer 302 through the computing resource service 322. The customer 302 may communicate with the computing resource service 322 of the computing resource service provider 310 through the network 306, which may be a communication network, such as the Internet, an intranet, an internet service provider (ISP) network and/or some other such network as described below.

The time-bound compute service 308 may be a service provided by the computing resource service provider 310 to allow the customer 302 and computing resource services to execute the containers 318 within the container instance 314. The time-bound compute service 308 may be similar to the time-bound compute service described in greater detail below. The computing resource service provider 310 may provide one or more computing resource services to its customers individually or as a combination of services of a distributed computer system. The one or more computing resource services of the computing resource service provider 310 may be accessible over the network 306 and may include services such as virtual computer system services, block-level data storage services, cryptography services, on-demand data storage services, notification services, authentication services, policy management services, task services and/or other such services. Not all embodiments described include all of the services described, and additional services may be provided in addition to, or as an alternative to, services explicitly described.

As one example, the computing resource service provider 310 may be an entity that provides computing resources, such as data storage services, virtual computer system services, and/or web services. Customers of the computing resource service provider 310 may communicate with one or more of the services via an interface, which may be a web services interface or any other type of customer interface. Each service provided by a computing resource service provider may have its own interface, and subsets of the services may have corresponding individual interfaces in addition to, or as an alternative to, a common interface.

In some examples, a "container instance" may refer to a computer system instance (virtual or non-virtual, such as a physical computer system running an operating system) launches and runs software containers. Thus, the container instance 314 may run the containers 318 in accordance with the request from the computing resource service 322 to invoke one or more tasks to process the job fragments of the batch job. One or more container instances may comprise a cluster. The computing resource service 322 may launch one or more containers 318 and then manage isolation of the containers 318 through application programming interface calls.

A container (also referred to as a software container, isolated user space instance, or as a compute instance) may be a lightweight virtualization instance running under a computer system instance that includes programs, data, and system libraries. As the container is run, the running program (i.e., the process) is isolated from other processes running in the same computer system instance. Thus, the containers 318 may each run on an operating system (e.g., using memory, CPU, and storage allocated by the operating system) of the container instance 314 and execute in isolation from each other (e.g., each container may have an isolated view of the file system of the operating system). Each of the containers 318 may have its own namespace, and applications running within the containers 318 are isolated by only having access to resources available within the container namespace. Thus, containers 318 may be an effective way to run one or more single applications within their own namespace. A container encapsulation system allows one or more containers to run within a single operating instance without overhead associated with starting and maintaining virtual machines for running separate user space instances. An example container encapsulation system is the Docker® container engine.

The containers 318 may be launched to have only specified resources from resources allocated to the container instance 314; that is, a container may be launched to have a certain amount of memory and to not utilize more than a specified amount of processing power. The resource allocation for the containers 318 may be specified in the entry for the batch job in the job database record and based at least in part on the division of the job definition file 304 by the fragmentation task invoked in response to a request from the computing resource service 320 to the time-bound compute service 310. Multiple containers may run simultaneously on a single host computer or host container instance, and the resources of the host can be allocated efficiently between the containers. In some embodiments, a host may support running containers in container instances from only one batch job. In other embodiments, a single host may allow multiple batch jobs to have container instances running on the host.

Different types of tasks may have different resource requirements and may have different lifespans. Thus, the containers 318 may be dynamically scheduled to run by a scheduler service in the time-bound compute service 308 independent of an underlying operating system of the container instance, and as such, the underlying operating system of the container instance 314 may be very basic. Alternatively, the containers 318 may be scheduled to run by a scheduler installed within the container instance 314.

Containers may also utilize other resources provided by the computing resource service provider. For example, each container may include a virtual network interface to allow the container to communicate through the virtual network to other containers and/or other resources of the computing resource service provider. Likewise, security credentials may be assigned on a per-container basis so that containers have their own security credentials to access the other resources provided by the computing resource service provider. Additionally, the time-bound compute service 308 may integrate with a load-balancing service to load-balance workloads directed at the containers. For example, the computing resource service 322 may present a list of Internet protocol addresses associated with virtual networks of the computing resource service's containers and/or instances to a load-balancer of the load-balancing service and instruct the load-balancer to balance workloads between the Internet protocol addresses. In addition, the time-bound compute service 308 may be integrated with an auto-scaling service to allow resources utilized by the containers to be dynamically adjusted as needed.

The container instances 318 may be managed through application programming interface calls made to the frontend service. For example, an application programming interface call could be made to request a list of what container instances 318 are available. Because containers may be run in any available container instance with sufficient resources, containers may be scaled up or down as needed, provided enough container instances are available. If the number of container instances 318 is insufficient, the container agent may adopt or otherwise obtain containers 318 from a predecessor as described above.

Figure 4:
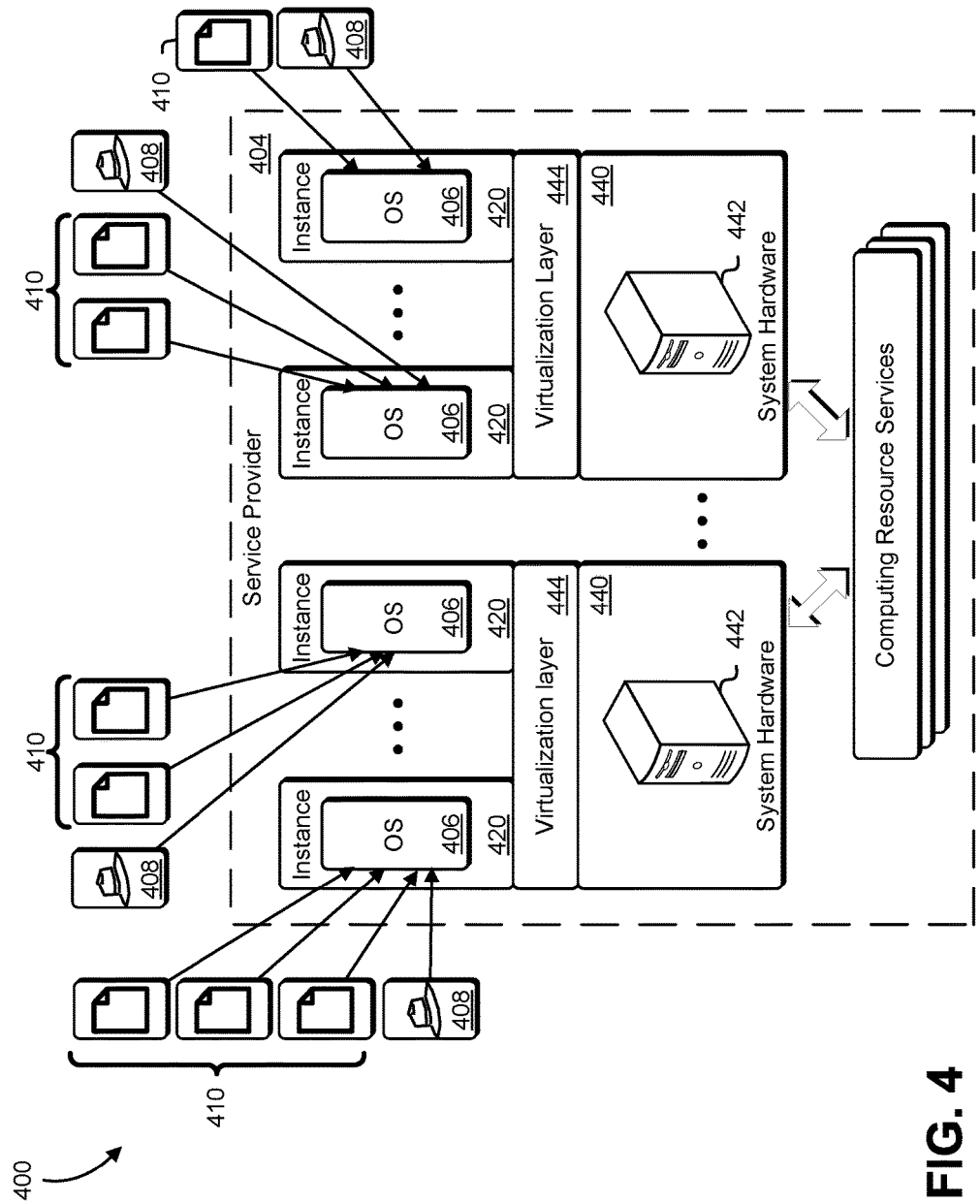
FIG. 4 shows an illustrative example of an environment which demonstrates an example of a virtualization of an time-bound compute service in accordance with at least one embodiment.

FIG. 4 shows an illustrative example of an environment 400 which demonstrates an example of a virtualization of an time-bound compute service 404 in accordance with at least one embodiment. Specifically, FIG. 4 depicts an time-bound compute service executing a plurality of virtual machines configured as container instances 420 in accordance with at least one embodiment. The time-bound compute service may provide system hardware 440 to customers and other computing resource services 402 of a computing resource service provider 404 providing the time-bound compute service to perform computation services within containers 410. The system hardware 440 may include one or more hosts 442, also referred to as host computer systems. Each of the hosts 442 may be any device or equipment configured to execute instructions for performing data computation, manipulation, or storage tasks, such as a computer or a server. The hosts 442 may be equipped with any needed processing capability, including one or more processors such as a central processing unit, a graphics processing unit, or a digital signal processor. The hosts 442 may also be equipped with memory (e.g., static and dynamic memory), buses, and input and output ports that are compliant with any handshaking, communications or data transfer protocol. The system hardware 440 may also include storage devices, such as storage disks and tapes, and networking equipment. The storage devices may be network storage devices managed by a data storage service.

Virtualization layers 444 in the system hardware 440 enable the system hardware 440 to be used to provide computational resources upon which one or more container instances 420 may operate. The virtualization layer 444 may be any device, software, or firmware used for providing a virtual computing platform for the container instances 420. The virtualization layers 444 executing on the hosts 442 enable the set of system hardware 440 to be used to provide computational resources necessary to support the container instances 420. Furthermore, the physical host 442 may host multiple virtualization layers of the same or different types on the same system hardware 440. Each container instance 420 may include various virtual computer components such as one or more virtual processors, virtual memory, and virtual storage. The container instances 420 may be provided to the computing resource services 402 of the computing resource service provider 404 tasked to perform batch jobs on behalf of customers of the computing resource service provider, and the computing resource services may run an operating system 406 and applications on each of the container instances 420. An example of a virtualization layer 444 includes a hypervisor.

Requests may be received by a request interface such as the front-end service 404 operated by the computing resource service provider 404. The request interface 414 may direct the request to the appropriate container instance. Each container instance 420 may include one or more software agents 408. The software agents 408 may allow the computing resource services 402 to manage their respective containers 410 and container instances. The software agents 408 may further perform logging of events and gather telemetry data related to the containers 410 and container instances 420. Examples of such software agents 408 are the container agents described above.

The operating systems 406 may be any operating systems suitable for running within the container instances 420 and that provide isolation technology that enable containerization schemes to isolate virtualization instances, such as the containers 410, from other processes running under the operating system 406. Examples of such operating systems include various implementations of Linux® operating systems that support resource isolation features in the Linux® kernel. As noted, the containers 410 may be virtualized instances within the operating systems 406 launched from application images in accordance with one or more task definitions and may be allocated resources from their respective container instances 420.

Figure 5:
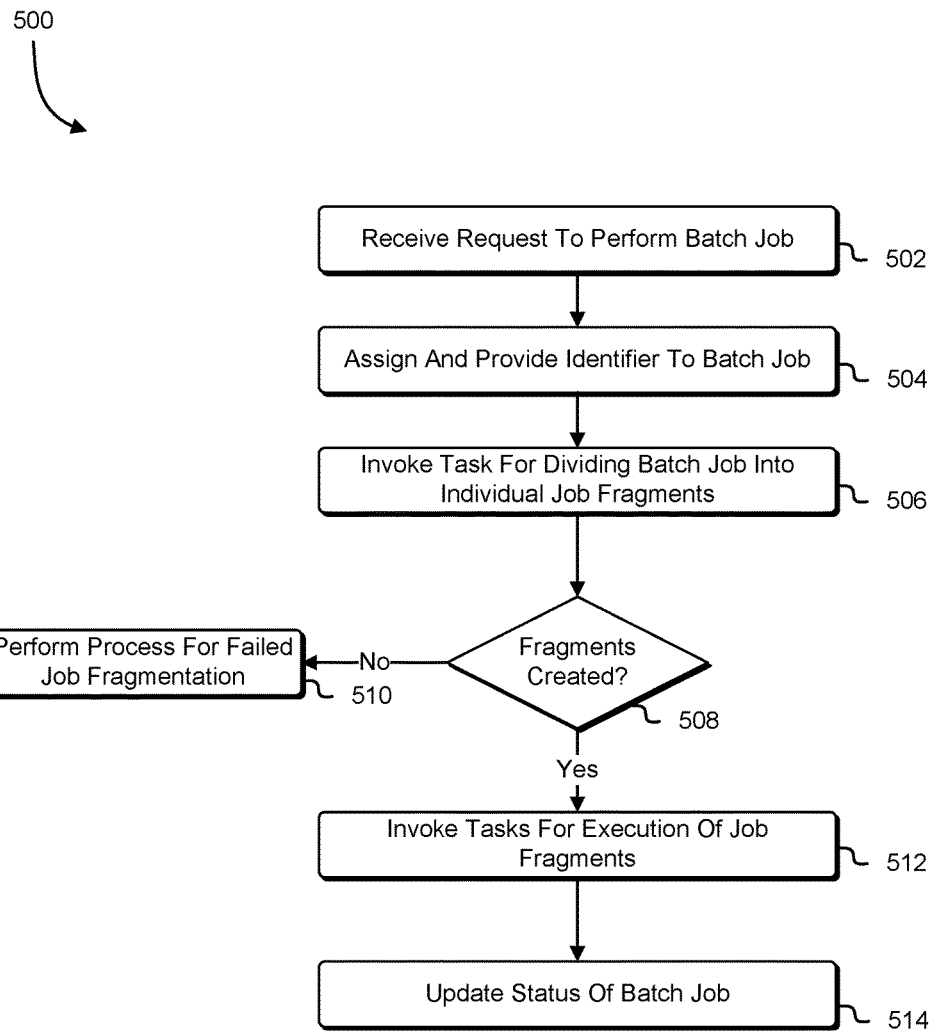
FIG. 5 shows an illustrative example of a process for invoking one or more tasks to partition a batch job into one or more job fragments for processing of the batch job in accordance with at least one embodiment.

As noted above, a computing resource service may receive a request from a customer to execute a batch job on behalf of the customer. In response to the request, the computing resource service may transmit a request to an time-bound compute service to invoke a fragmentation task. This fragmentation task may divide the batch job into one or more job fragments, whereby each of the job fragments is created such that a job fragment may be processed by a job fragment task within the lifespan of the job fragment task. The computing resource service and the fragmentation task may update a job database record and a job fragment database record to update the status of the batch job and of the one or more job fragments generated by the fragmentation task. Accordingly, FIG. 5 shows an illustrative example of a process 500 for invoking one or more tasks to partition a batch job into one or more job fragments for processing of the batch job in accordance with at least one embodiment. The process 500 may be performed by a computing resource service in conjunction with a fragmentation task, which may be invoked by the computing resource service to divide a batch job into one or more job fragments.

As described above, a customer of a computing resource service provider may transmit a request to a computing resource service provided by the computing resource service provider to execute a batch job on behalf of the customer. In order for the customer to interact with the computing resource service provider and access the computing resource service, the customer may be required to provide credential information for authentication to a GUI. The computing resource service provider may utilize the provided credential information to authenticate the customer and determine whether the customer is authorized to submit batch jobs for execution. If the computing resource service provider successfully authenticates the customer and determines that the customer is authorized to submit batch jobs for execution, the computing resource service provider may provide the request from the customer to the computing resource service. Thus, the computing resource service may receive 502 the request from the customer to perform the batch job.

In an embodiment, the computing resource service, in response to the request from the customer, generates a job database record for the batch job from the customer to track processing of the batch job. For instance, the computing resource service may transmit a request to a database service provided by the computing resource service provider to generate the job database record. Alternatively, the computing resource service may generate and maintain the job database record locally. In the job database record, the computing resource service may generate an entry for the batch job that includes a unique identifier for the batch job, a definition of the operations that are to be performed as part of the batch job, an attribute that indicates which task is responsible for executing the batch job, and the state of the batch job. In some embodiments, the computing resource service assigns 504 a unique identifier to the batch job, which the computing resource service specifies in the entry for the batch job in the job database record. Additionally, the computing resource service may submit a request to a time-bound compute service to invoke a task that can be used to initiate processing of the batch job. The computing resource service may provide, in its request, the unique identifier assigned to the batch job.

The time-bound compute service, in response to the request, may invoke 506 a compute instance that may operate as a fragmentation task according to a task definition defined in the job database record. The fragmentation task may obtain the task definition specified in the job database record and determine how to divide the batch job into one or more job fragments that can be processed by individual job fragment tasks. For instance, the fragmentation task may evaluate the task definition from the job database record to identify one or more operation endpoints for the batch job. Based at least in part on these identified one or more operation endpoints, the fragmentation task may attempt division of the batch job into individual job fragments such that each job fragment may be processed by a job fragment task within its lifespan.

In some embodiments, the fragmentation task accesses the job database record to create an entry for each of the job fragments generated by the fragmentation task from the batch job. Each entry may describe what operations of the batch job are to be performed as part of the job fragment. Additionally, each entry may specify the identifier of the batch job to which the job fragment belongs, a unique identifier for the job fragment, the definition of the operations to be performed as part of the entire batch job, and the state of the job fragment. The fragmentation task may also add an attribute in the job database record that denotes the total number of job fragments that the batch job was divided into. Thus, the computing resource service may evaluate this database record to determine 508 whether the one or more job fragments have been created successfully.

If the one or more job fragments are not created successfully, the computing resource service may perform 510 a process for failed job fragmentation operations. For instance, the computing resource service may transmit a notification to the customer to indicate that the batch job could not be completed successfully. Alternatively, the computing resource service may submit a new request to the time-bound compute engine to invoke a new fragmentation task that can divide the batch job into the corresponding job fragments. In some instances, the computing resource service may manually determine the number of endpoints for each job segment to cause the fragmentation task to divide the batch job into job fragments according to the number of endpoints per job fragment specified by the computing resource service.

If the computing resource service determines that the one or more job fragments were created successfully by the fragmentation task, the computing resource service may transmit a request to the time-bound compute service to invoke 512 the one or more job fragment tasks that will execute the operations specified in the job fragments. In some embodiments, the fragmentation task can invoke the one or more job fragments without need for the computing resource service to interact further with the time-bound compute service. The computing resource service or the fragmentation task (whichever invokes the job fragment tasks) may access the job database record to update 514 the status of the batch job to indicate that the batch job is being processed by the one or more job fragment tasks.

Figure 6:
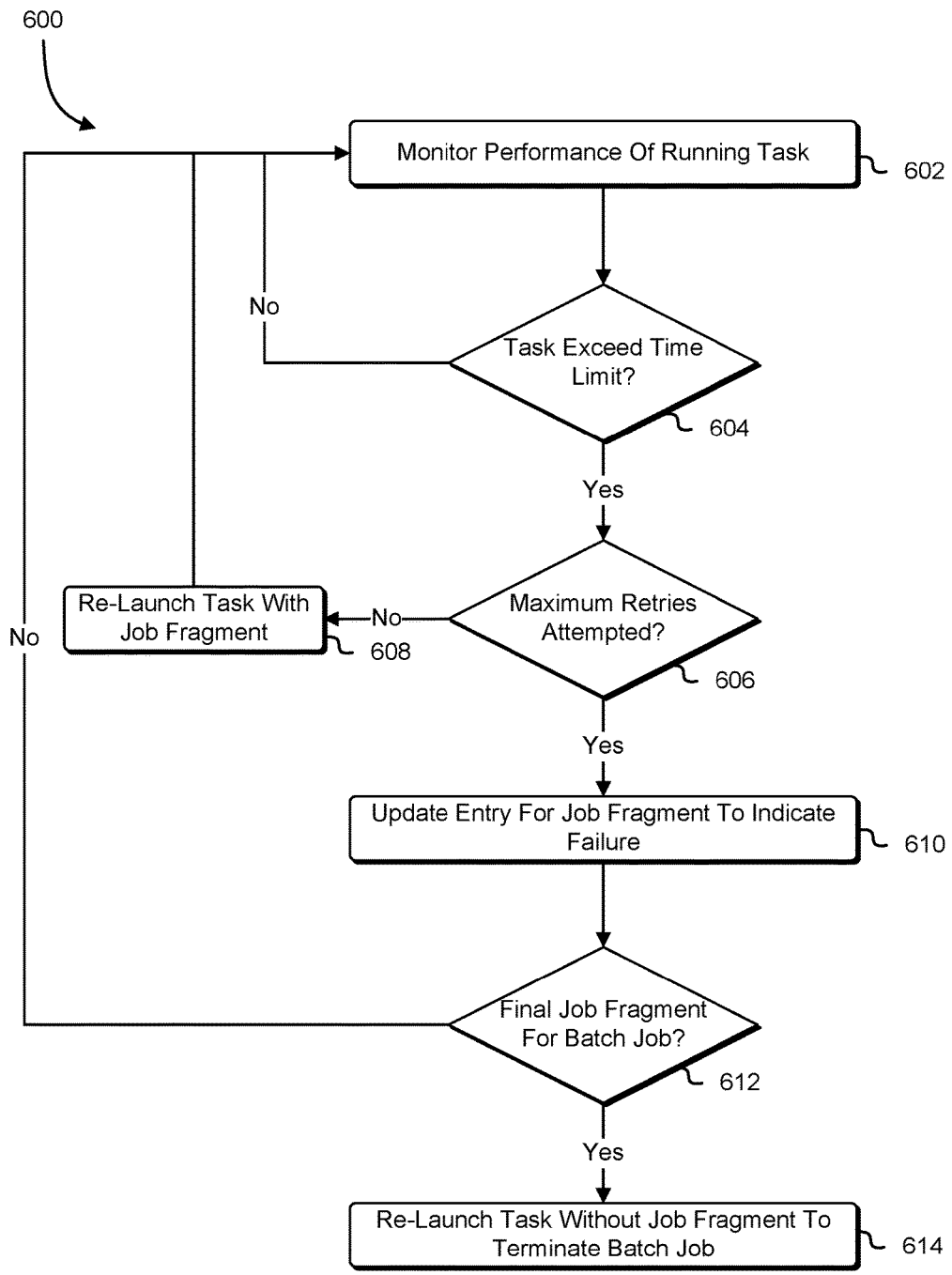
FIG. 6 shows an illustrative example of a process for monitoring one or more job fragment tasks to determine whether the one or more job fragment tasks have successfully processed their corresponding job fragments in accordance with at least one embodiment.

As noted above, the computing resource service may transmit a request to the time-bound compute service to invoke a monitoring task that can monitor the one or more job fragment tasks to determine whether the one or more job fragments are being processed successfully. The monitoring task may access a job fragment database record to identify any job fragments that have an execution timestamp that is older than the lifespan of their corresponding job fragment tasks. If so, the monitoring task may invoke a new job fragment task to retry processing of the failed job fragment. Accordingly, FIG. 6 shows an illustrative example of a process 600 for monitoring one or more job fragment tasks to determine whether the one or more job fragment tasks have successfully processed their corresponding job fragments in accordance with at least one embodiment. The process 600 may be performed by the aforementioned monitoring task, which may be invoked by the computing resource service at intervals based at least in part on the lifespan for a job fragment task.

In an embodiment, a computing resource service transmits a request to the time-bound compute service to invoke a monitoring task that can monitor job fragments created by the fragmentation task to determine whether any of the job fragments have failed. The monitoring task may access the job fragment database record to query for entries corresponding to job fragments that specify an executed or processing state. The monitoring task may organize any identified job fragments based at least in part on the timestamp for each of the identified job fragments, starting with the oldest timestamp. The monitoring task may monitor 602 each of these identified job fragments to determine 604 whether a timestamp is older than the lifespan of a job fragment task.

If the timestamp for a job fragment is within the bounds of the lifespan for a job fragment task, the monitoring task may continue to monitor 602 of other job fragments identified through evaluation of the state of the job fragments. However, if the monitoring task determines that a timestamp for a job fragment is older than the lifespan of a job fragment task, the monitoring task may determine that the job fragment has not been successfully processed and has failed. In an embodiment, if a job fragment has failed, the monitoring task updates an entry corresponding to the failed job fragment in the job fragment database record to introduce an attribute for a retry count if the attribute is not present in the entry. If the retry count attribute is added to the entry, the monitoring task may set the retry count attribute to zero or some other designation to denote that no retries have been performed. However, if the retry count attribute is present, the monitoring task may determine 606 whether the maximum number of retries have been attempted 606.

If the monitoring task determines that the maximum number of retries for a failed job fragment have not been performed, the monitoring task may re-launch 608 a job fragment task to process the failed job fragment. For instance, the monitoring task may invoke a new job fragment task and pass to the job fragment task an identifier for the failed job fragment. This may cause the new job fragment task to obtain the definition of work for the job fragment from the job fragment and initiate processing of the job fragment. Further, the monitoring task may update the entry for the job fragment to specify the new timestamp for when the new job fragment task was invoked. The monitoring task may also increment the retry count attribute for the job fragment by one or some other designator to denote that a retry has occurred.

However, if the monitoring task determines that the maximum number of retries for a failed job fragment has been reached, the monitoring task may update the entry for the job fragment to indicate that the job fragment has failed. Additionally, the monitoring task may determine 612 whether the failed job fragment is the final job fragment for the batch job. For instance, the monitoring task may access the job database record to identify, for the batch job, the total number of job fragments for the batch job and the total number of completed and failed job fragments for the batch job. If the total number of completed and failed job fragments equals the total number of job fragments for the batch job, the monitoring task may re-launch 614 a job fragment task without passing to the job fragment task the identifier for the failed job fragment. Instead, the monitoring task may provide the job fragment task with the identifier of the batch job. This may cause the job fragment task to determine whether the batch job has been completed successfully and to update the status of the batch job accordingly. Alternatively, if the job fragment is not the final job fragment for the batch job, the monitoring task may continue to monitor the active job fragments.

Figure 7:
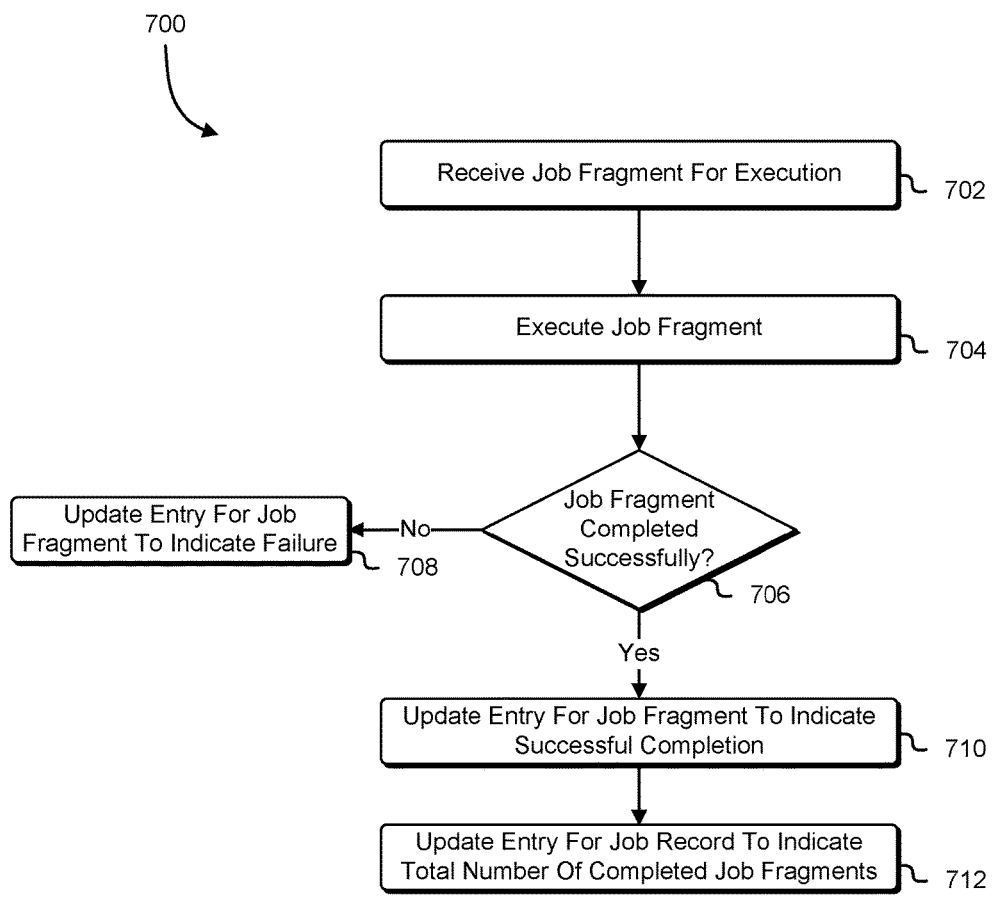
FIG. 7 shows an illustrative example of a process for executing a job fragment and updating a job database record to indicate a status for execution of the job fragment in accordance with at least one embodiment.

As noted above, the computing resource service may transmit a request to the time-bound compute service to invoke a job fragment task for each of the job fragments created by the fragmentation task. The time-bound compute service may pass, to the job fragment task an identifier of a job fragment, which may cause the job fragment task to identify the operations to be performed for the job fragment. The job fragment task may execute the job fragment and update the entry corresponding to the job fragment once the job fragment has been successfully processed or has failed. Accordingly, FIG. 7 shows an illustrative example of a process 700 for executing a job fragment and updating a job database record to indicate a status for execution of the job fragment in accordance with at least one embodiment. The process 700 may be performed by any job fragment task configured to process job fragments.

In response to a request from the computing resource service, the time-bound compute service may invoke a job fragment task for each of the job fragments created by the fragmentation task based at least in part on the endpoints of the batch job (e.g., estimated completion times for operations of the batch job based at least in part on the configuration of a compute instance). The time-bound compute service may pass, to the job fragment task, a unique identifier of a particular job fragment that is to be processed by the job fragment task. Thus, the job fragment task may receive 702 the job fragment from the time-bound compute service for execution of the job fragment. This may cause the job fragment task to access the job fragment database record to identify an entry corresponding to the assigned job fragment and to determine the operations that comprise the job fragment. Further, the job fragment task may update the entry to indicate that the job fragment is being processed.

Using the information garnered from the entry for the job fragment in the job fragment, the job fragment task may execute 704 the job fragment. For instance, the job fragment task may perform the one or more operations specified in the entry corresponding to the job fragment. In some embodiments, the job fragment task determines 706 if the job fragment is processed successfully. For instance, the job fragment task may determine that the job fragment is processed successfully if the one or more operations corresponding to the job fragment are completed. However, if the job fragment task terminates processing of an operation prematurely due to an error or other failure, the job fragment task may determine that processing of the job fragment has not been completed successfully. In this case, the job fragment task may update 708 the entry for the job fragment in the job fragment database record to indicate that the job fragment has failed. In some embodiments, the job fragment task will not update the entry and, instead, allow the monitoring task described above determine that the processing of the job fragment has failed based at least in part on the timestamp for the job fragment.

If the job fragment is processed successfully, the job fragment task may update 710 the entry corresponding to the job fragment to indicate successful completion of the job fragment. For instance, the job fragment task may access the job fragment database record and identify the entry for the job fragment to update the state of the job fragment. Additionally, the job fragment task may access the job database record to update 712 the entry for the batch job to indicate the total number of completed job fragments. The job fragment task may increment this entry by one or some other value that can be used to denote that a job fragment has been processed successfully.

Figure 8:
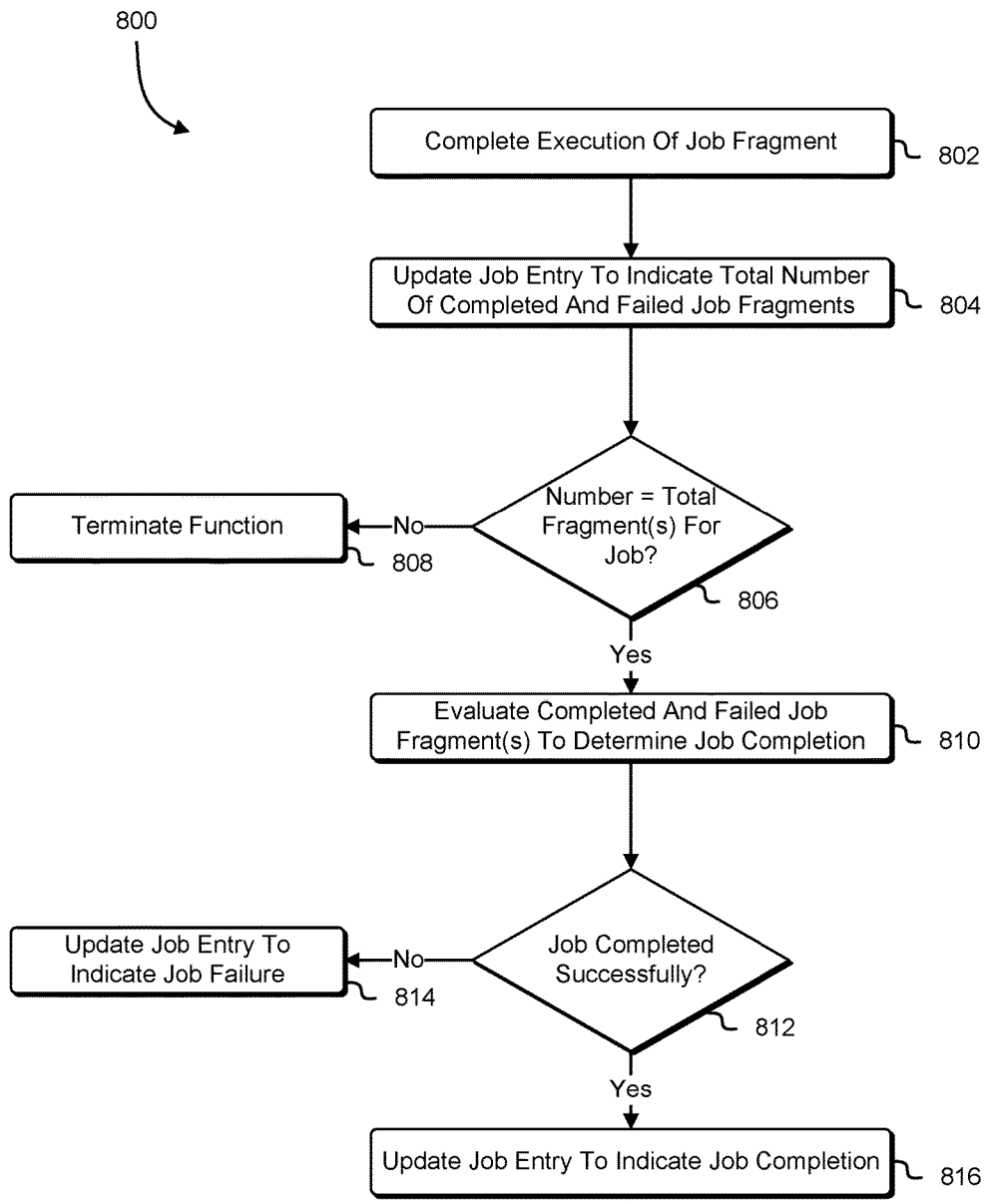
FIG. 8 shows an illustrative example of a process for indicating completion of a job based at least in part on the successful execution of one or more job fragments in accordance with at least one embodiment.

In an embodiment, the job fragment task determines whether the processed job fragment is the final job fragment for the batch job. If so, the job fragment task may evaluate the completed and failed job fragments of the batch job to determine whether the batch job has been completed successfully. Based at least in part on this determination, the job fragment task may update the entry for the batch job in the job database record to indicate the completion state of the batch job, which may indicate either successful completion of the batch job or failure. Accordingly, FIG. 8 shows an illustrative example of a process 800 for indicating completion of a job based at least in part on the successful execution of one or more job fragments in accordance with at least one embodiment. The process 800 may be performed by any job fragment task configured to process a job fragment.

Similar to the process described above in connection with FIG. 7, a job fragment task may process an assigned job fragment and complete 802 execution of the one or more operations of the job fragment. Additionally, the job fragment task may access the job database record to update 804 the entry for the batch job to indicate the total number of completed and failed job fragments. For instance, the job fragment task may increment an entry corresponding to the number of processed job fragments by one or some other value that can be used to denote that a job fragment has been processed successfully. In an embodiment, the job fragment task evaluates the entry for the batch job in the job database record to determine 806 if the total number of completed job fragments and failed job fragments is equal to the total number of job fragments for the batch job. If the total number of completed job fragments and failed job fragments is less than the total number of job fragments for the batch job, the job fragment task may terminate 808 function.

If the total number of completed and failed job fragments is equal to the total number of job fragments for the batch job, the job fragment task may evaluate 810 the completed and failed job fragments to determine batch job completion. For instance, the job fragment task may evaluate the entry for the batch job in the job database record to identify one or more criteria for determining whether the job is completed successfully. The one or more criteria may include: successful performance of particular operations, a maximum number of acceptable failed job fragments, a minimum number of successfully processed job fragments, and the like. Based at least in part on these one or more criteria, the job fragment task may determine 812 whether the batch job has been completed successfully. If the batch job has not been completed successfully, the job fragment task may update 814 the entry in the job database record to indicate that the batch job has failed. This may cause the computing resource service to transmit a notification to the customer indicating that the batch job could not be completed. However, if the batch job is completed successfully, the job fragment task may update 816 the entry in the job database record to indicate that the batch job has been completed successfully. The computing resource service may notify the customer to inform the customer that the batch job has been completed.

Figure 9:
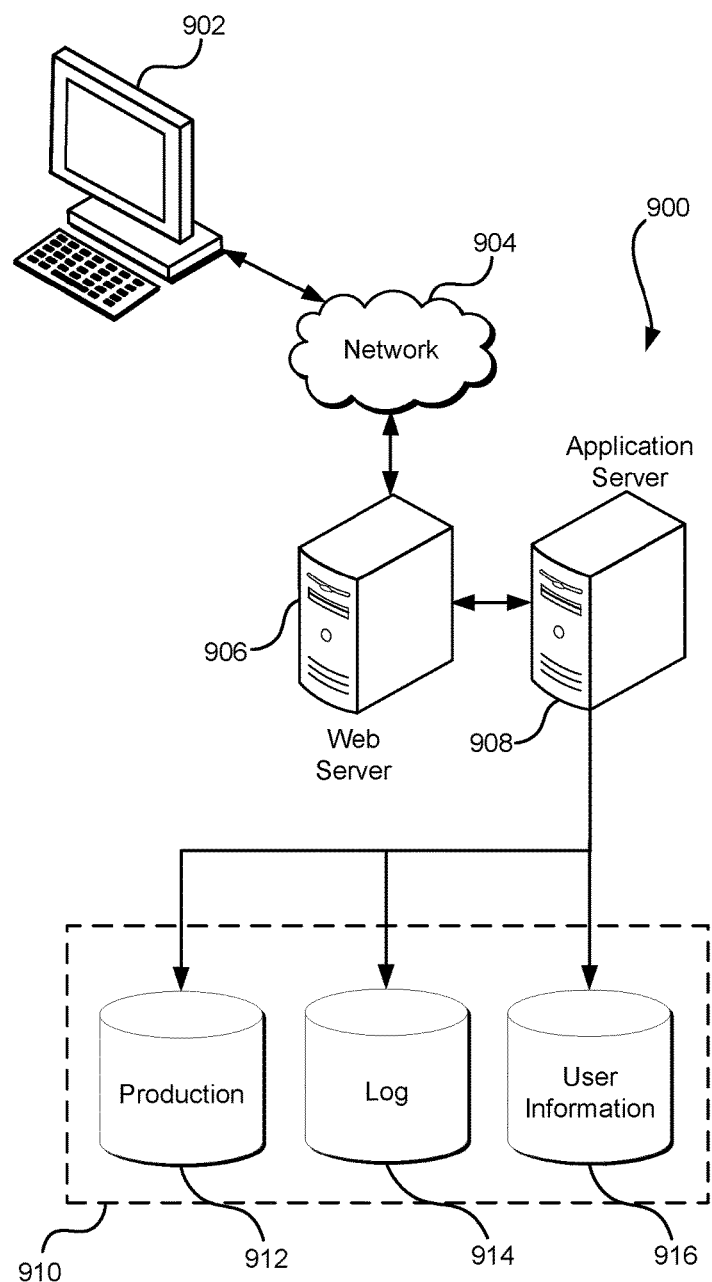
FIG. 9 shows an illustrative example of an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a request to execute a batch job, wherein completion of the batch job involves a plurality of operations to be completed for the batch job;
invoking a first time-bound compute instance to divide the batch job into a plurality of job fragments, each job fragment of the plurality of job fragments comprising a respective subset of the plurality of operations;
distributing the plurality of job fragments among a plurality of second time-bound compute instances to cause the plurality of second time-bound compute instances to collectively process the plurality of job fragments;
determining individual statuses of individual job fragments of the plurality of job fragments, where an individual status of a respective job fragment indicates whether the respective job fragment has been completely processed by a respective time-bound compute instance of the plurality of second time-bound compute instances, wherein the respective job fragment is to be processed during a limited lifespan of the respective time-bound compute instance;
determining a status of the batch job based at least in part on the individual statuses; and
determining if processing of the respective job fragment has failed, thereby being a failed job fragment, as a result of the limited lifespan of the respective time-bound compute instance expiring before completion of the processing of the failed job fragment.

2. The computer-implemented method of claim 1, further comprising:
invoking a third time-bound compute instance to retry processing of the failed job fragment; and adding an attribute to an entry in a database corresponding to the failed job fragment to denote that processing of the failed job fragment is being retried.

3. The computer-implemented method of claim 1, further comprising:
dividing the failed job fragment into a plurality of second job fragments, each second job fragment of the plurality of second job fragments comprising a respective subset of a plurality of operations of the failed job fragment; and
distributing the plurality of second job fragments among a plurality of third time-bound compute instances to cause the plurality of third time-bound compute instances to collectively process the plurality of second job fragments.

4. The computer-implemented method of claim 1, wherein each job fragment of the plurality of job fragments is idempotent.

5. A system, comprising:
one or more processors; and
memory including instructions that, as a result of being executed by the one or more processors, cause the system to:
a) invoke a first time-bound compute instance to divide a batch job comprising a plurality of operations into a plurality of job fragments, each job fragment of the plurality of job fragments comprising a respective subset of the plurality of operations;
b) distribute the plurality of job fragments among a plurality of second time-bound compute instances to cause the plurality of second time-bound compute instances to collectively process the plurality of job fragments;
c) determine a status of the batch job based at least in part on individual statuses of the plurality of job fragments, where an individual status of a respective job fragment indicates whether the respective job fragment has been completely processed during a limited lifespan of a respective second time-bound compute instance of the plurality of second time-bound compute instances; and
d) determine if processing of the respective job fragment has failed, thereby being a failed job fragment, as a result of the limited lifespan of the respective second time-bound compute instance expiring before completion of processing of the failed job fragment.

6. The system of claim 5, wherein the instructions further cause the system to:
identify, based at least in part on an entry corresponding to the failed job fragment in a database, a retry count for the failed job fragment; and
invoke a third time-bound compute instance to retry processing of the failed job fragment if the retry count is less than a predefined maximum retry count.

7. The system of claim 6, wherein the instructions further cause the system to update the entry corresponding to the failed job fragment to indicate that the failed job fragment has failed if the retry count attains the predefined maximum retry count.

8. The system of claim 5, wherein the instructions further cause the system to:
divide the failed job fragment into a plurality of second job fragments, each second job fragment of the plurality of second job fragments comprising a respective subset of a plurality of operations of the failed job fragment; and
invoke a plurality of third time-bound compute instances to collectively process the plurality of second job fragments.

9. The system of claim 8, wherein the instructions further cause the system to:
evaluate an entry for the failed job fragment in a database to identify a timestamp for the failed job fragment, the timestamp specifying a time at which a second time-bound compute instance of the plurality of second time-bound compute instances was invoked to process the failed job fragment,
wherein determining if processing of the failed job fragment has failed comprises determining if the timestamp is older than a limited lifespan of the second time-bound compute instance.

10. The system of claim 5, wherein the instructions further cause the system to determine that the batch job has completed successfully as a result of a minimum number of statuses of the individual statuses of the plurality of job fragments indicate successful processing of corresponding job fragments.

11. The system of claim 5, wherein each job fragment of the plurality of job fragments corresponds to a respective subset of the plurality of operations that does not overlap with another subset of the plurality of operations of other job fragments of the plurality of job fragments.

12. The system of claim 5, wherein:
each second time-bound compute instance of the plurality of second time-bound compute instances determines whether a corresponding job fragment processed by the second time-bound compute instance is a final job fragment processed for the batch job; and
as a result of the corresponding job fragment being the final job fragment, the second time-bound compute instance evaluates the individual statuses of the plurality of job fragments to determine the status of the batch job.

13. A non-transitory computer-readable storage medium having stored thereon executable instructions that, as a result of being executed by one or more processors of a computer system, cause the computer system to at least:
identify, for a job, a plurality of operations to be performed to complete the job;
divide the plurality of operations into a plurality of job fragments, each job fragment of the plurality of job fragments comprising a respective subset of the plurality of operations;
distribute the plurality of job fragments among a plurality of time-bound compute instances to cause the plurality of time-bound compute instances to collectively process the plurality of job fragments;
determine statuses of individual time-bound compute instances of the plurality of time-bound compute instances, where a status of an individual time-bound compute instance of the plurality of time-bound compute instances indicates whether a respective job fragment has been completely processed during a limited lifespan of the individual time-bound compute instance of the plurality of time-bound compute instances;
determine a status of the job based at least in part on statuses of the individual time-bound compute instances of the plurality of time-bound compute instances; and
determine if processing of the respective job fragment has failed, thereby being a failed job fragment, as a result of the limited lifespan of the individual time-bound compute instance expiring before completion of processing of the failed job fragment.

14. The non-transitory computer-readable storage medium of claim 13, wherein the respective subset of the plurality of operations is idempotent.

15. The non-transitory computer-readable storage medium of claim 13, wherein the executable instructions further comprise executable instructions that further cause the computer system to:
divide the failed job fragment into a plurality of second job fragments, each second job fragment of the plurality of second job fragments comprising a respective subset of operations corresponding to the failed job fragment; and
invoke a plurality of second time-bound compute instances to collectively process the plurality of second job fragments.

16. The non-transitory computer-readable storage medium of claim 13, wherein the executable instructions further cause the computer system to:
identify a retry count for the failed job fragment; and
invoke a third time-bound compute instance to retry processing of the failed job fragment if the retry count is less than a predefined maximum retry count.

17. The non-transitory computer-readable storage medium of claim 16, wherein the executable instructions further cause the computer system to:
identify a timestamp for the failed job fragment, the timestamp specifying a time at which a time-bound compute instance of the plurality of time-bound compute instances was invoked,
wherein determining if processing of the failed job fragment has failed comprises determining if the timestamp is older than a limited lifespan of the time-bound compute instance.

18. The non-transitory computer-readable storage medium of claim 16, wherein the executable instructions further cause the computer system to update a database entry corresponding to the failed job fragment to indicate that the failed job fragment has failed if the retry count attains the predefined maximum retry count.

19. The non-transitory computer-readable storage medium of claim 13, wherein the status of the job indicates that the job has been completed successfully if a minimum number of individual statuses of the plurality of job fragments indicate successful processing of respective job fragments.

20. The non-transitory computer-readable storage medium of claim 13, wherein the status of the job indicates that the job has failed to be completed if a number of individual statuses of the plurality of job fragments indicating that respective job fragments have failed to be processed attains a maximum number of failed job fragments.

* * * * *